Dec. 9, 1924.
G. W. HEBBELER
DEMOUNTABLE RIM
Filed Dec. 28, 1922
1,518,739
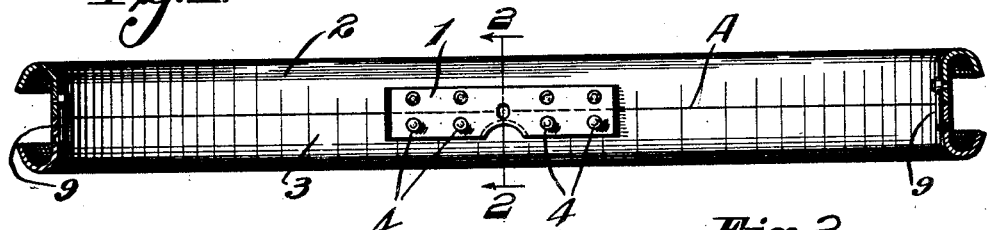
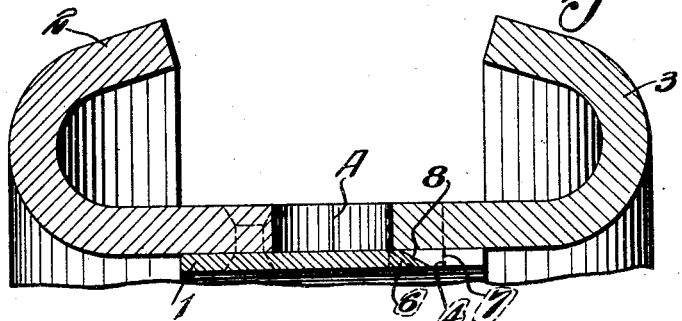
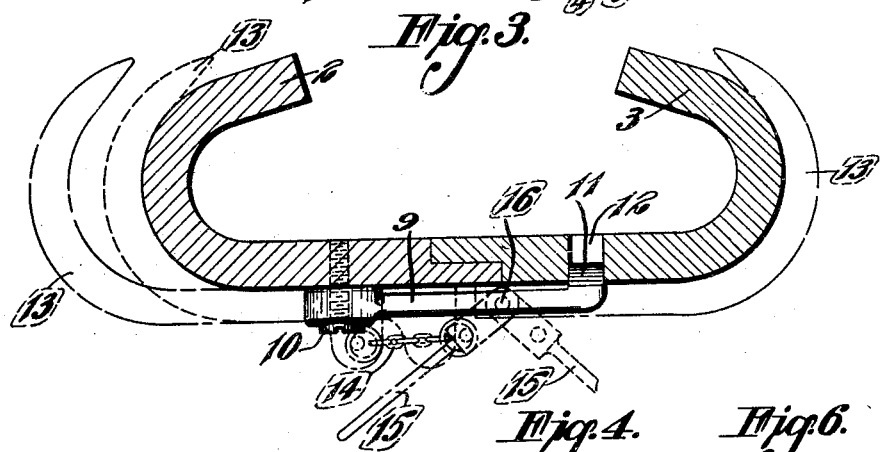
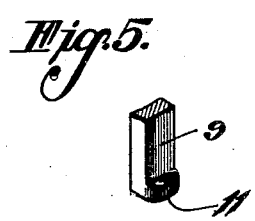
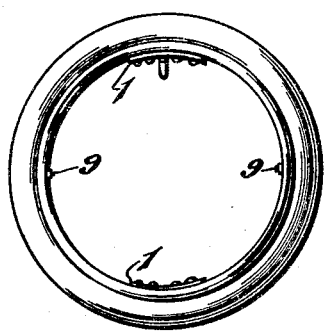
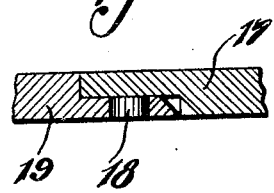
Inventor.
GEORGE W. HEBBELER,
By J. R. Cornwall, Atty.

Patented Dec. 9, 1924.

1,518,739

UNITED STATES PATENT OFFICE.

GEORGE W. HEBBELER, OF ST. LOUIS, MISSOURI.

DEMOUNTABLE RIM.

Application filed December 28, 1922. Serial No. 609,530.

*To all whom it may concern:*

Be it known that I, GEORGE W. HEBBELER, a citizen of the United States, residing at Saint Louis, Missouri, have invented a certain new and useful Improvement in Demountable Rims, of which the following is a full, clear, and exact description, such as will enable others skilled in the art to which it appertains to make and use the same, reference being had to the accompanying drawings, forming part of this application.

My invention relates to vehicle wheels and consists in an improved demountable rim for wheels equipped with pneumatic tires. In the use of what is known as clincher tires, it is customary to make the rim of one rigid piece and to force the tires on and off the rim by prying and stretching a short length of the tire bead over a corresponding portion of the rim flange. In the use of straight side tires it is customary to cut the rim transversely and spring it inwardly so as to lap the ends and reduce the diameter of the rim to permit mounting and demounting of the tire.

The object of my invention is to eliminate the forcing of the tire over the rim or the springing of the rim parts as above referred to. I accomplish this object by splitting the rim longitudinally so as to form two ring-like sections, each possessing a tire retaining flange opposed to the corresponding flange on the other section, and providing means for securing these two sections together. Incidental to the above construction it is desirable to provide means for forcing the two rim sections together when the tire is first mounted on the rim.

In the accompanying drawings which illustrate a selected embodiment of my invention I have shown my invention as adapted for clincher tires, but it will be understood that the same may be used for straight side tires without material changes. In these drawings—

Figure 1 is a section through a rim showing one-half of the rim in elevation.

Figure 2 is a transverse section through the rim drawn on an enlarged scale and taken on the line 2—2 of Figure 1.

Figure 3 is a corresponding section taken at a point approximately ninety degrees from line 2—2 of Figure 1.

Figure 4 is an elevation of a rim with a tire mounted thereon.

Figure 5 is a detail view of one of the rim section connections.

Figure 6 is a detail section of a modified construction.

The rim is split longitudinally along the line A of Figure 1 and the split sections may be abutted against each other as shown in Figure 2 throughout their circumferences, or their joint may be shiplapped as indicated in Figure 3 throughout their circumferences, or the sections may be abutted together throughout a portion of their circumferences and shiplapped through the remainder of their circumferences.

Relatively short rigid plates 1 are fixedly and permanently secured to one of the sections 2 of the split rim and each projects beyond the edge of section 2 over the face of the adjacent portion of the other rim section 3. This projecting portion is perforated to accommodate cooperating pins 4 mounted upon section 3. Preferably each of the pins 4 is beveled as indicated at 6, Figure 2, to permit plate 1 when slid transversely of the pin to ride over the latter into the securing position illustrated. When the rim sections are assembled and a pneumatic tire is mounted on the same and inflated, the pressure in the tire will press outwardly on the two sections, resulting in a frictional engagement between pins 4 and plate 1 which will resist any accidental tendency to separate the plate and rim. This resistance may be increased, if desired, by slightly inclining the engaging portions of the pin and plate as indicated by the line 7 in Figure 2. Each plate 1 is notched intermediate its ends and undercut as indicated at 8, Figure 2, so as to receive a tool adapted to be inserted under the notch whereby the plate may be pried off of pins 7 and the rim sections separated.

Such prying operation tends to elongate the pin rim slightly and if four plates 1 were disposed about the periphery of the rim, it is obvious that elongation of one of the rim sections will be resisted by the two plates positioned ninety degrees therefrom. To eliminate this disadvantage, I provide removable connections 9 intermediate the diametrically opposite plates 1. These connections consist of dogs or fingers having one end attached to one section by a screw 10 or by other means whereby the dog may be loosened somewhat from the rim section upon which it is mounted. The other end of the connection is provided with a lug 11 which fits into a recess 12 in the other rim section when screw 10 or equivalent means is tightened as illustrated in Figure 3.

It will be understood that in mounting a tire upon the rim, plates 1 will first be engaged with pins 4 and then connections 9 positioned and tightened and in removing a tire from the rim these operations will be reversed, the connections 9 being first loosened and then plates 1 pried over pins 4.

With small tires, the rim sections 2 and 3 ordinarily may be easily forced together by the hand or by laying the rim on the ground and standing on the upper edge. With larger sizes, or if the assembly is resisted for any reason, the rim sections may be forced together by means of the tool such as shown in Figure 3, which consists of two hooks 13 adapted to engage the sides of the rim sections and provided with an off-center clamping device including a chain 14 secured to one hook and to a lever 15 which is pivoted on the other hook at 16. The operation of this device is apparent from inspection of the two positions of the chain, lever and the left hand hook. Other clamping devices may be employed for similar purposes. The joint between the two rim sections may be shiplapped for a short distance only and plate 1 may be omitted, the functions of the plate being performed by the underportion of the shiplapped joint. This arrangement is indicated in Figure 6, in which portion 17 of one section of the rim mounts the pins 18 which enter perforations in the cooperating portion 19 of the other section of the rim.

Various other modifications in the details of construction of my device may be made without departing from the spirit of my invention as expressed in the accompanying claims.

I claim:

1. In combination, a demountable rim for a pneumatic tire, split into longitudinal sections adapted to be removed from each other, means for assembling said sections together including a rigid plate fixedly secured to one of said sections, projecting over a face of the other of said sections, and having perforations in its projecting portion, and pins on said latter section adapted to engage said perforations.

2. In combination, a demountable rim for a pneumatic tire, split into longitudinal sections having a shiplap joint, a rigid plate fixedly secured to the inner flange of one of said joint forming sections projecting over a face of the other of said sections and having perforations in its projecting portion, and pins on said latter section adapted to engage said perforations.

3. In combination, a demountable rim for a pneumatic tire, split longitudinally throughout its circumference, means for assembling said sections together including a rigid plate fixedly secured to one of the resulting rim sections, extending over the adjacent portion of the other section and there perforated to receive cooperating pins provided on the latter section, and a connection detachably secured to each of said rim sections and spaced from said plate about the periphery of the rim.

4. In combination, a demountable rim for a pneumatic tire, split longitudinally throughout its circumference, relatively short rigid plates spaced about one hundred eighty degrees apart, each permanently and fixedly secured to the inner periphery of one of the resulting rim sections, extending over the adjacent portion of the other section and then perforated to receive cooperating pins provided on the latter section, and connections intermediate said plates, each detachably secured to said rim sections.

In testimony whereof I hereunto affix my signature this 8th day of December, 1922.

GEORGE W. HEBBELER.